United States Patent
Kenney et al.

(10) Patent No.: US 11,509,338 B2
(45) Date of Patent: Nov. 22, 2022

(54) NESTED FEEDBACK FOR OFFSET CANCELLATION IN A WIRELINE RECEIVER

(71) Applicant: Analog Devices, Inc., Wilmington, MA (US)

(72) Inventors: John Kenney, West Windsor, NJ (US); Robert Schell, Chatham, NJ (US); Rahul Vemuri, Greensboro, NC (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

(21) Appl. No.: 17/204,618

(22) Filed: Mar. 17, 2021

(65) Prior Publication Data
US 2021/0297100 A1   Sep. 23, 2021

Related U.S. Application Data

(60) Provisional application No. 62/991,326, filed on Mar. 18, 2020.

(51) Int. Cl.
*H04B 1/12* (2006.01)

(52) U.S. Cl.
CPC .................. *H04B 1/123* (2013.01)

(58) Field of Classification Search
CPC .................................................... H04B 1/123
See application file for complete search history.

(56) References Cited

U.S. PATENT DOCUMENTS

| | | | |
|---|---|---|---|
| 7,778,613 B2 | 8/2010 | Seendripu et al. | |
| 8,674,766 B2 | 3/2014 | Doany et al. | |
| 8,868,007 B2 | 10/2014 | Terry | |
| 10,097,383 B1* | 10/2018 | Bulzacchelli | H04L 25/03057 |
| 10,498,461 B1 | 12/2019 | Vera Villarroel et al. | |
| 11,133,963 B1* | 9/2021 | Zheng | H04B 1/123 |
| 2013/0107925 A1 | 5/2013 | Au et al. | |
| 2016/0330049 A1 | 11/2016 | Roh et al. | |
| 2017/0264470 A1* | 9/2017 | Wang | H04L 25/4917 |
| 2018/0048377 A1* | 2/2018 | Gustavsson | H04B 7/0417 |
| 2020/0082872 A1* | 3/2020 | Seo | G11C 29/021 |
| 2021/0075405 A1* | 3/2021 | Shin | H03K 3/017 |

FOREIGN PATENT DOCUMENTS

EP   0964557   12/1999

OTHER PUBLICATIONS

A Sequential Two-Step Algorithm for DC Offset Cancellation of PAM-4 Receiver (Year: 2002).*

* cited by examiner

*Primary Examiner* — Dac V Ha
(74) *Attorney, Agent, or Firm* — Akona IP PC

(57) ABSTRACT

Systems and methods are provided for optimizing offset compensation in a receiver with multiple offset compensation D/A converters. At each stage where offset cancellation is applied, there is a fan-out of two or more. At the final stage, comparator offset compensation codes are summed and compared against a digital reference. In one version the digital reference is zero. A second implementation has a non-zero digital reference which is the sum of comparator offsets stored from start up. The difference between the sum of offsets and digital reference is applied to a digital accumulator. The most significant bits of the digital accumulator are applied to a digital D/A converter, which cancel analog offsets in an intermediate stage of amplifiers. The summation of offsets feeding into an accumulator is implemented for all preceding stages.

20 Claims, 11 Drawing Sheets

NESTED FEEDBACK FOR OFFSET CANCELLATION IN A WIRELINE RECEIVER

CROSS REFERENCE TO RELATED APPLICATIONS

This application is related to and claims the benefit of priority under 35 U.S.C. § 119(e) to U.S. Provisional Patent Application No. 62/991,326 entitled, "Nested Feedback for Offset Cancellation in a Wireline Receiver" filed on Mar. 18, 2020, which is hereby incorporated by reference in its entirety

FIELD OF THE DISCLOSURE

The present invention relates to the field of receivers, and in particular wireline receivers.

BACKGROUND

Many electronic systems use wireline communication, which allows for high bandwidth throughput. Communication systems often support wireless and wireline communications between wireless and/or wireline communication devices. Examples of wireline systems include ethernet and landline phones, and communication systems such as cellular phones, internet, and in-home WiFi networks often include wireline components for transmitting signals to, from, and/or between base stations. Some categories of wireline communication include fiber optic, coaxial cable, and twisted pair. Wireline communication systems include a receiver, and the receiver path can include multiple locations at which offsets are introduced.

SUMMARY OF THE DISCLOSURE

Systems and methods are provided for optimizing DC offset cancelling digital-to-analog (D/A) converters at multiple tap points along a wireline receive path. Downstream offset information is utilized to set the target of control loops for upstream cancellation loops. Updates are performed in a non-disruptive manner so the wire-line link operates error free while D/A codes are changing.

A method is disclosed to optimize offset compensation in a receiver with multiple offset compensation D/A converters. At each stage where offset cancellation is applied, there is a fan-out of at least two. At the final stage, comparator offset compensation codes are summed and compared against a digital reference. In one version the digital reference is zero. A second implementation has a non-zero digital reference which is the sum of comparator offsets stored from start up. The difference between the sum of offsets and digital reference is applied to a digital accumulator. The MSBs of the digital accumulator are applied to a digital D/A converter, which cancels analog offsets in an intermediate stage of amplifiers. The summation of offsets feeding into an accumulator is implemented for all preceding stages.

According to one aspect, a method is provided for optimizing offset compensation in a receiver including receiving a signal at an input in a receive path, applying offset cancellation to the signal at each of a plurality of offset compensation digital-to-analog converters, generating a plurality of offset compensation codes at a plurality of comparators, summing at least a subset of the plurality of offset compensation codes, comparing the summed offset compensation codes with a digital reference. In some implementations, applying offset cancellation includes applying offset cancellation to the signal when the receive path includes a fan-out of at least two. In some implementations, generating the offset compensation codes at the comparators includes generating data comparison codes at multiple data comparators and generating error comparator codes at multiple comparators. In some examples, the method includes switching one of the set of data comparators with one of the set of error comparators.

According to another aspect, a system for optimizing offset compensation in a receiver is provided, including an input for receiving a signal in a receive path, a plurality of digital-to-analog converters configured to apply offset compensation, a plurality of comparators configured to generate a plurality of offset compensation codes, a summer configured to sum at least a subset of the plurality of offset compensation codes, and a comparator for comparing the summed offset compensation codes with a digital reference. In some examples, the receive path includes a fan-out of at least two, and at least one of the digital-to-analog converters is configured to apply offset compensation prior to the fan-out. In some implementations, the comparators include a set of data comparators configured to execute a data comparison function and a set of error comparators configured to execute an error comparison function. In some examples, at least one of the set of data comparators is switched with at least one of the set of error comparators.

According to another aspect, a system is provided for optimizing offset compensation in a receiver, comprising an input for receiving a signal in a receive path, a plurality of digital-to-analog converters, configured to apply offset compensation to the signal, means for generating a plurality of offset compensation codes, and means for comparing offset compensation codes with a digital reference.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Systems and methods are provided for optimizing offset compensation in a receiver with multiple offset compensation D/A converters. At each stage where offset cancellation is applied, there is a minimum fan-out of two. At the final stage, comparator offset compensation codes are summed and compared against a digital reference. In one version the digital reference is zero. A second implementation has a non-zero digital reference which is the sum of comparator offsets stored from start up. The difference between the sum of offsets and digital reference is applied to a digital accumulator. The most significant bits (MSBs) of the digital accumulator are applied to a digital D/A converter, which cancels analog offsets in an intermediate stage of amplifiers. The summation of offsets feeding into an accumulator is implemented for all preceding stages.

Systems and methods disclosed herein address the problem of offset cancellation in a wireline receiver where offsets are introduced at multiple locations along the receiver path.

Figure 1:
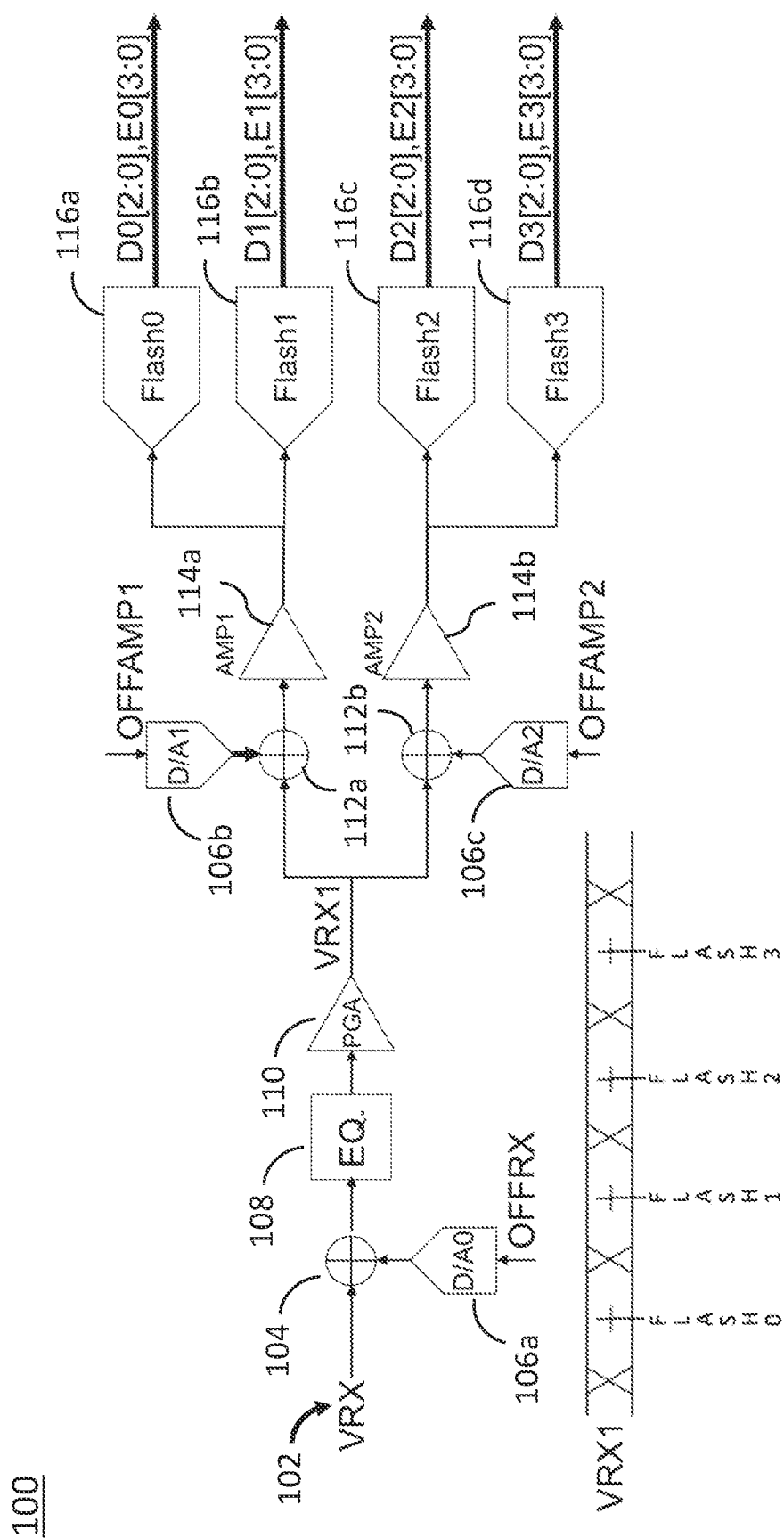
FIG. 1 is a diagram illustrating a wireline receiver with quarter-rate sampling and multiple D/A converters, according to some embodiments of the disclosure.

FIG. 1 is a block diagram of a wireline receiver 100 with quarter-rate sampling, and multiple D/A converters 106a, 106b, 106c implementing offset correction. As shown in FIG. 1, the receiver 100 also sub-samples the applied input data stream into multiple slicers. In some examples, the receiver performs half-rate sampling, and in some examples, the receiver 100 preforms quarter-rate sampling.

Offset accumulation along the signal path can lead to asymmetrical saturation of an amplifier, is avoided by inserting offset-cancelling D/A converters 106a, 106b, 106c at multiple stages. Multi-tap offset cancellation has more than one solution, so a circuit is needed to choose a set of offset cancellation codes that yield highest SNR at the slicer input. Methods for optimizing multiple levels of offset cancellation in a wireline receive path are disclosed, whereby downstream offset information is utilized to set the target of control loops for upstream cancellation loops.

The receiver 100 receives an input signal 102, and the input signal 102 is added to the output of a first offset cancelling D/A converter 106a at a first adder 104. In various examples, the input signal 102 is a non-return-to-zero (NRZ) data stream. The output from the first adder 104 is input to an equalizer 108, and the output from the equalizer 108 is input to a programmable gain amplifier 110. The output from the amplifier 110 is split into two parallel lines. The signal on one parallel line is input to a second adder 112a, where it is added to the output of a second offset-cancelling D/A converter 106b. The signal on the other parallel line is input to a third adder 112b, where it is added to the output of a third offset-cancelling D/A converter 106c.

The output from the second adder 112a is input to a first voltage amplifier 114a, and the output from the first voltage amplifier 114a is split into two parallel lines and input into a first flash analog-to-digital converter (ADC) 116a and a second flash ADC 116b. The output from the third adder 112b is input to a second voltage amplifier 114b, and the output from the second voltage amplifier 114b is split into two parallel lines and input into a third flash ADC 116c and a fourth flash ADC 116d.

According to some implementations, the receiver 100 of FIG. 1 is a quarter-rate receiver with accommodations for a multi-level eye. Two examples of detectors with multi-level eyes are PAM-4 and a single-tap loop unrolled decision feedback equalizer (DFE). Mismatches in CMOS analog blocks introduce DC offsets at multiple stages within the receive path. Some of the analog blocks which have mismatch induced offsets can include the equalizer 108, the programmable gain amplifier 110, the parallel first 114a and second 114b voltage amplifiers, and voltage comparators internal to the first 116a, second 116b, third 116c, and fourth 116d flash ADCs.

Quarter-rate sampling is used in receivers for high-speed links (e.g., 25 Gb/s) to optimize power, and provide time for voltage comparators to resolve metastability. FIG. 1 shows four distinct eyes which are sampled in rotation by first 116a, second 116b, third 116c, and fourth 116d flash ADCs. At a data rate of 25 Gb/s, a single bit period is 40 ps. In quarter-rate sampling, each flash sampler samples at a clock frequency of 6.25 GHz, where the four sampling clock phases are phase-shifted by 40 ps relative to adjacent phases. All comparators within the four flash converters have offsets, which are locally compensated.

One consequence of quarter-rate sampling is that the on-chip die area expands due to redundant flash converters. This redundancy increases the loading on prior stages. Therefore, in the implementation shown in FIG. 1, separate first 114a and second 114b parallel amplifiers are employed to drive the additional loads. At nodes where the fan-out is greater than one, such as the programmable gain amplifier 110, output, or flash ADC 116a, 116b, 116c, 116d input, offset cancelling D/A converters may be placed on each new branch. In the implementation shown in FIG. 1, the first parallel amplifier 114a has its input-referred offset nullified by the second D/A converter 106b and the second parallel amplifier 114b has its input-referred offset nullified by the third D/A converter 106c.

Figure 2:
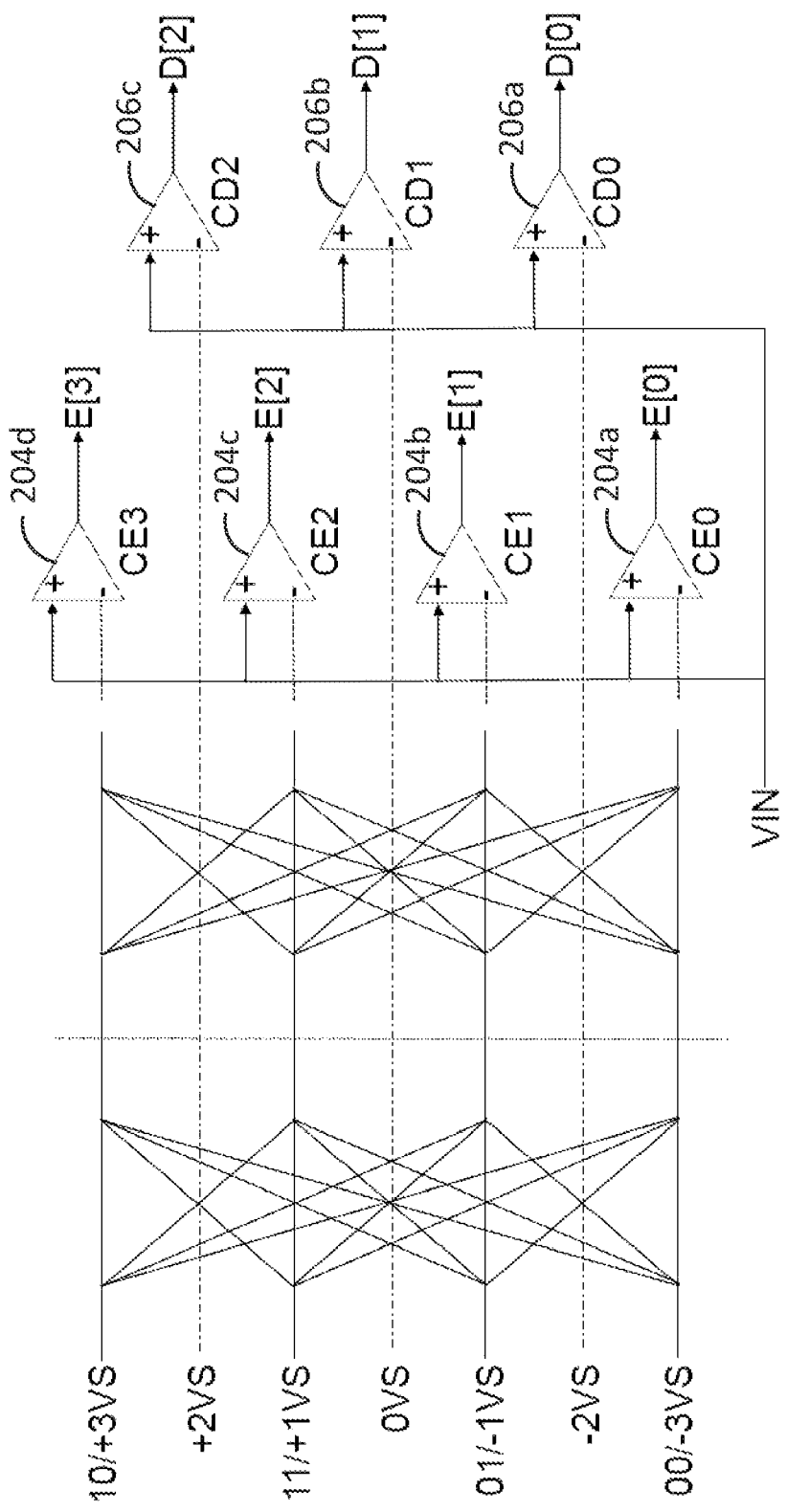
FIG. 2 is a diagram illustrating a flash converter that can be used with PAM-4 signaling, according to some embodiments of the disclosure.

In various implementations, wireline receivers use SGN-SGN least-mean square (LMS) to adapt equalizer coefficients, adjust the programmable gain amplifier gain, implement DC offset compensation, and perform phase detection for timing recovery. FIG. 2 shows a flash converter 200 that can be used with 4-level Pulse Amplitude Modulation (PAM-4) signaling. In particular, FIG. 2 shows a flash A/D converter 200 for a PAM-4 receiver implementing SGN-SGN LMS. In some examples, the SGN-SGN LMS is the product of the sampled error signal multiplied by the sampled derivative of the error signal with respect to the parameter being optimized. In LMS, the signal ek has a continuous-voltage range. The comparator quantizes the voltage of ek to either +1 or −1, generating the sgn(ek). Thus:

If $ek>0$, then sgn($ek$)=+1 else sgn($ek$)=−1

The derivative for the DC offset loop is +1. Thus, the update expression for the DC offset loop is:

sgn($ek$)×sgn(1)=sgn($ek$)

In FIG. 2, a first set of comparators includes first 204a CE0, second 204b CE1, third 204c CE2, and fourth 204d CE3 comparators. The first set of comparators are error comparators. The first 204a CE0, second 204b CE1, third 204c CE2, and fourth 204d CE3 comparators are applied to quantize the applied slicer input at its ideal voltage levels. A second set of comparators includes first 206a CD0, second 206b CD1, and third CD2 comparators. The second set of comparators perform data recovery.

Each of the first and second sets of comparators have internal D/A converters for offset cancellation. In some examples, the offset control words for the error comparators (first 204a CE0, second 204b CE1, third 204c CE2, and fourth 204d CE3 comparators), are OFFE[k] for k=0 to 3. Similarly, in some examples, the offset control words for the data comparators (first 206a CD0, second 206b CD1, and third CD2 comparators) are OFFD[k] for k=0 to 2. Before the link is established, the register values setting OFFE[k] and OFFD[k] are adjusted to cancel the comparator offsets. Over time, the offsets of the first 204a CE0, second 204b CE1, third 204c CE2, fourth 204d CE3, and first 206a CD0, second 206b CD1, and third CD2 comparators can change due to environmental factors such as temperature, varying power supply, or aging. A technique is provided to adjust D/A codes within each comparator after the link has been operating so the input-referred offsets can be nullified without degrading bit error rate performance.

According to various implementations, the receiver 100 in FIG. 1 has multiple solutions for offset control words that drive the slicer offset to 0. For example, assume the gain from the input signal 102 (VRX) to the output from the programmable gain amplifier 110 (VRX1) is unity, and there are no offsets on the input of any circuit elements in the signal chain. One solution sets the input to the first D/A converter 106a (OFFRX) such the first D/A converter 106a output is +10 mV. The input to the second D/A converter 106b (OFFAMP2) and the input to the third D/A converter 106c (OFFAMP2) are set such that the second D/A converter 106b and the third D/A converter 106c are both −10 mV to cancel the offset introduced by the input to the first D/A converter 106a (OFFRX). A second solution has 0 mV at the outputs of the first 106a, second 106b, and third 106c D/A converters.

According to some implementations, an offset cancellation architecture is used for setting codes for the offset compensation codes in a serial link, which has a global minima. Furthermore, the offset cancellation architecture minimizes the range of offset codes used. In the example provided above, the second solution with the outputs of the first 106a, second 106b, and third 106c D/A converters all equal to zero mV does not cause voltage amplifier saturation. In contrast, the first solution, in which the first D/A converter 106a output is +10 mV, which is cancelled by the second 106b and third 106c D/A converter outputs can result in voltage amplifier saturation due to voltage headroom constraints. Adding a +10 mV offset on the input to compensate for a −10 mV offset introduced downstream means the amplifier loses 20 mV of swing for a positive output relative to a negative output swing.

Comparator Offset Cancellation for Multi-Level Eye

Figure 3:
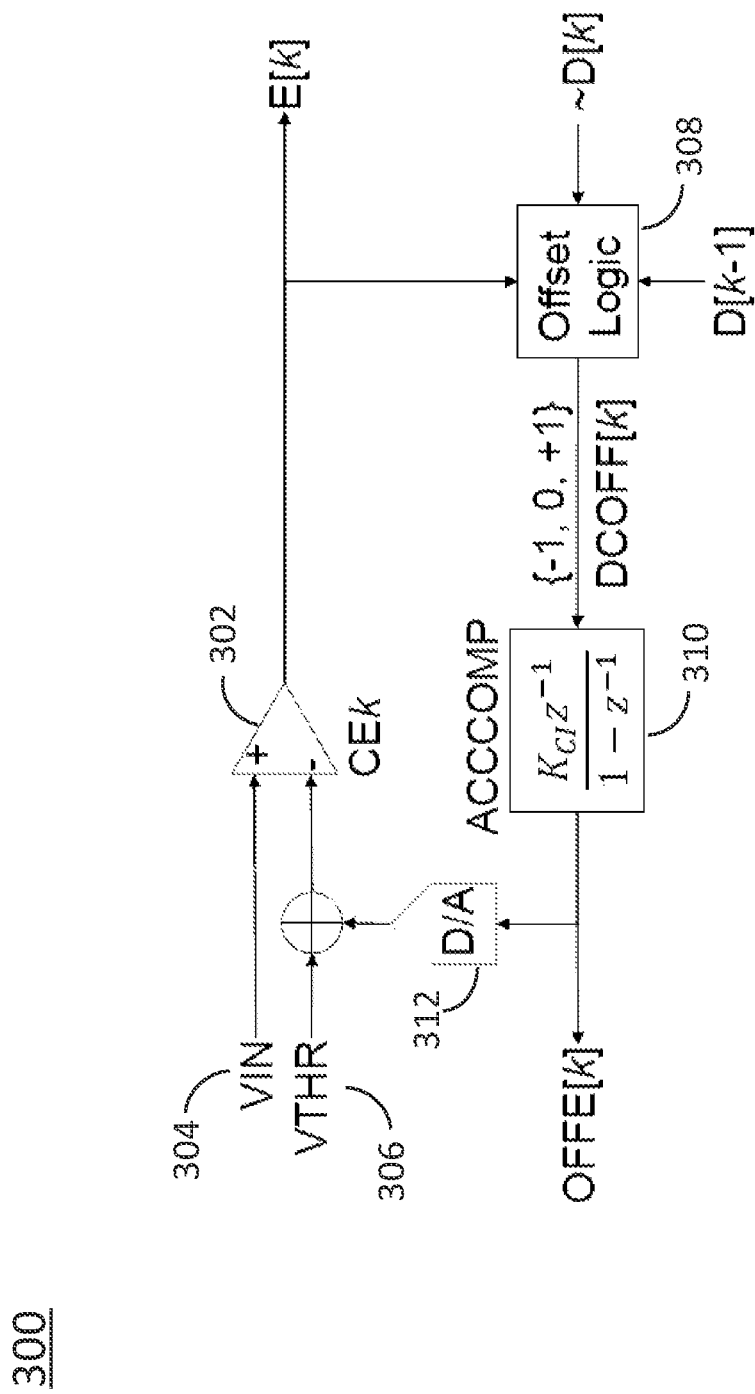
FIG. 3 is a diagram illustrating comparator offset cancellation, according to some embodiments of the disclosure.

FIG. 3 is a diagram 300 illustrating comparator offset cancellation, according to various embodiments of the disclosure. Systems and methods are provided herein for offset cancellation for the comparators used in PAM4 and loop-unrolled DFE which are two representative multi-level eyes. FIG. 3 shows a comparator 302 including offset compensation. The comparator 302 has a high-speed data input 304 (VIN), and a DC input for a voltage threshold 306 (VTHR). The offset compensation loop from the output of the comparator 302 back to the DC input 306 of the comparator 302 has offset logic 308 to determine if the comparator 302 has a positive or a negative polarity. The comparator 302 includes a D/A converter 312 for cancelling DC offset. The input to the D/A converter 312 is an offset OFFE[k], and is a digital input of a D/A code. The digital value of the D/A code is contained in the accumulator 310. The accumulator 310 resides in a central digital code or in firmware. According to various implementations, other circuit implementations for shifting a comparator threshold which do not directly add a D/A output to a voltage reference, VTHR, can be used. Hence, the scope of this invention is not limited to offset compensation utilizing a D/A circuit as shown in FIG. 3.

In one example, at startup, the data input 304 (VIN) and DC input 306 (VTHR) are both set to zero volts. The offset OFFE[k] can be swept from its most negative setting to its most positive setting. The value at which E[k] flips polarity can be used as the initial comparator 302 offset. A successive approximation algorithm may also be used to determine an initial setting for the offset OFFE[k]. Another example runs multiple trials of an offset compensation loop at startup, where the average of multiple trials is used for the offset OFFE[k]. In general, a system includes multiple comparators 302, and the offset compensation loop can be run on some or all comparators simultaneously Offsets computed at startup may not produce lowest bit error once the link is running, due to environmental factors previously mentioned. The next section describes the offset logic used for PAM 4, with the loop running.

PAM 4

Systems and methods are provided for dealing with offset cancellation of the four error comparators in a PAM-4 receiver. Referring back to FIG. 2, the flash converter 200 can be used with 4-level Pulse Amplitude Modulation (PAM-4) signaling. The flash converter 200 is a flash A/D converter. As shown in FIG. 2, there are four equally spaced ideal signal voltages at −3VS, −VS, +VS and +3VS. The first set of comparators includes first 204a CE0, second 204b CE1, third 204c CE2, and fourth 204d CE3 comparators, and the thresholds of each of the comparators 204a, 204b, 204c, 204d are set to the signal voltages −3Vs, −VS, +VS, and +3VS, respectively. The second set of comparators includes first 206a CD0, second 206b CD1, and third CD2 comparators, and each of the comparators 206a, 206b, 206c have voltage thresholds at −2VS, 0, and +2VS, respectively.

Thus, with reference to FIG. 2, the first set of comparators are error comparators, and the signal voltage thresholds VTHR have the following values:
First comparator 204a: VTHR=−3VS
Second comparator 204b: VTHR=−1VS
Third comparator 204c: VTHR=+1VS
Fourth comparator 204d: VTHR=+3VS The output from the converter is the output from the second set of comparators 206a, 206b, 206c. As shown in FIG. 2, the output from the first comparator 206a is D[0], the output from the second comparator 206b is D[1], and the output from the third comparator 206c is D[2]. PAM-4 transmits two bits per symbol. The recovered word for Gray-encoded data is $s_k$. The decision rule for $s_k$ is:
!D[0]: $s_k$=00
D[0] & !D[1]: $s_k$=01
D[1] & !D[2]: $s_k$=11
D[2]: $s_k$=01

The error E[k] is output from the first set of comparators. The output from the first comparator 204a is E[0], the output from the second comparator 204b is E[1], the output from the third comparator 204c is E[2], and the output from the fourth comparator 204d is E[3]. The error E[k] is meaningful if the ideal value for VIN is VTHR. As an example, when the sequence 01 is transmitted, the ideal slicer value is −1VS. The enable bits are determined from the data comparators 206a, 206b, 206c as:

ENABLE_E[0]=!D[0]
ENABLE_E[1]=D[0] & !D[1]
ENABLE_E[2]=D[1] & !D[2]
ENABLE_E[3]=D[2]

The update to accumulator k (e.g., the accumulator 310 of FIG. 3) applies the following logic:

ENABLE_E[k] & E[k]: DCOFF[k]=+1
ENABLE_E[k] & ~E[k]: DCOFF[k]=−1
~ENABLE_E[k]: DCOFF[k]=0

According to various implementations, the circuit in FIG. 3 implements a delta modulator, where CEk is the quantizer, followed by an integrator ACCCOMP, and a D/A converter 312 whose output sums back to the loop input. Delta modulators are inherently stable, although peak-to-peak voltage deviations caused by limit cycles must be controlled by making the LSB voltage size of the D/A small and setting a low bandwidth by using a small value for $K_{CI}$. A delta modulator with sufficiently high bandwidth relative to that of the signal it's tracking implements an A/D converter. This property can be used to linearize the block diagram for the comparator offset compensation, which is useful when analyzing the nested offset compensation loops.

The second set of comparators, the data comparators CD0 206a, CD1 206b and CD2 206c also have offsets that shift over time. The offset compensation codes are periodically updated to account for environmental shifts in the thresholds of each of the comparators 206a, 206b, 206c. Updating the offset of a data comparator 206a, 206b, 206c is achieved by swapping the definition of a data and an error comparator. One possible swap has the comparator CE3 204d implements the data comparison function for the comparator CD2 206c while the comparator CD2 206c implements the error function of the comparator CE3 204d. Maintaining bit error free data reception means that the comparator CD2 206c and the comparator CE3 204d have a time interval during which they are both recovering data bits. During this time interval, the error computation associated with the comparator CE3 204d is disabled. Once it is determined that the bit sequence from the comparator CE3 204d and the comparator CD2 206c are identical, the comparator CD2 206c can have its threshold set to +3VS. The comparator CD2 206c now implements the error function previously done by the comparator CE3 204d so its offset can be updated using the identical logic and algorithm that were previously employed for the comparator CE3 204d.

1-Tap Speculative Decision Feedback Equalizer (DFE)

Figure 4:
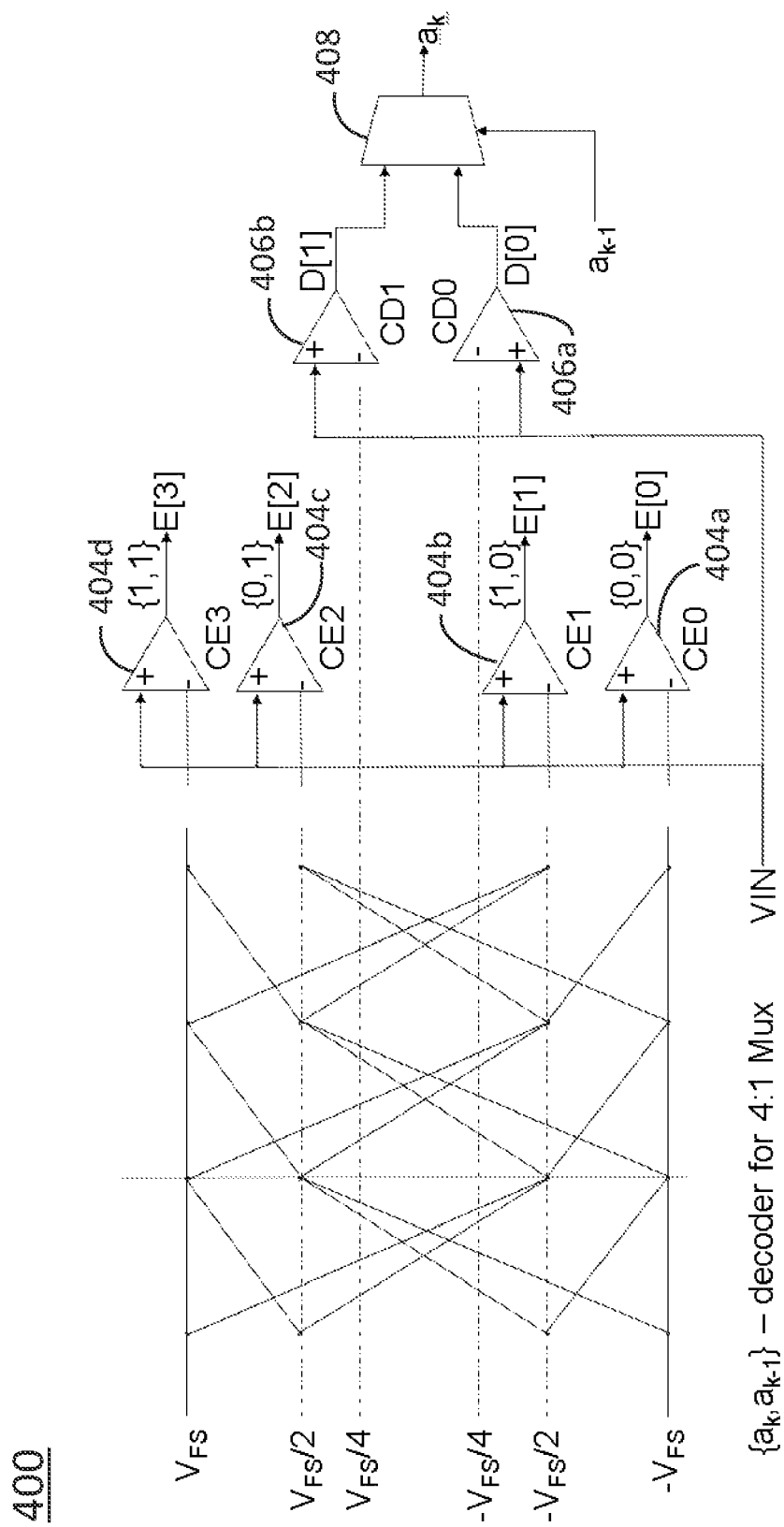
FIG. 4 shows a single tap speculative DFE, according to some embodiments of the disclosure.

Speculative DFE has found widespread usage in high-speed wireline links. FIG. 4 shows a single tap speculative DFE 400, according to some embodiments of the disclosure. In some implementations, in the single tap speculative DFE 400 of FIG. 4 the ideal slicer input is:

$$VIN=V_{FS}(1-b_1)a_k+b_1a_{k-1})$$

where $b_1$ is a single post cursor inter-cursor interference (ISI). According some examples, FIG. 4 shows a flash converter for 1-tap speculative DFE with $b_1$=0.25. The bit $a_k$ is the current bit being detected and $a_{k-1}$ is the prior received bit. Similar to a PAM-4, the slicer input is a 4-level eye, although the post-cursor $b_1$ is generally optimized to increase the slicer signal-to-noise ratio (SNR). Unlike PAM-4, the speculative DFE outputs 1-bit per symbol period.

In FIG. 4 there are two data comparators, a first data comparator CD0 406a and a second data comparator CD1 406b. The threshold for the first data comparator CD0 406a is $-b_1V_{FS}$ and the threshold for the second data comparator CD1 406b is $b_1V_{FS}$. The previously received bit $a_{k-1}$ selects either the output from the first data comparator 406a (D[0]) or the output from the second data comparator 406b (D[1]) according to the following decision rule:

If $(a_{k-1}==0)a_k=D[0]$; else $a_k=D[1]$;

Since the receiver has four potential slicer levels, a 4:1 multiplexer chooses one of the four error comparator 404a, 404b, 404c, 404d outputs according to the following decision rule:

Switch($a_{k-1}$, $a_k$) {
  Case 00: $e_k$ =E[0]; break;
  Case 10: $e_k$ =E[1]; break;
  Case 01: $e_k$ =E[2]; break;
  Case 11: $e_k$ =E[3]; break;
}

Updates to accumulators used in dc offset cancellation of the error comparators 404a, 404b, 404c, 404d follow the logic:

ENABLE_E[0]: !$a_{k-1}$ & !$a_k$
ENABLE_E[1]: $a_{k-1}$ & !$a_k$
ENABLE_E[2]: !$a_{k-1}$ & $a_k$
ENABLE_E[3]: $a_{k-1}$ & $a_k$

The update to accumulator k follows the logic:
ENABLE_E[k] & E[k]: DCOFF[k]=+1
ENABLE_E[k] & ~E[k]: DCOFF[k]=−1
~ENABLE_E[k]: DCOFF[k]=0

The first 406a CD0 and second 406b CD1 data comparators have offsets that shift over time. Like the PAM-4 receiver described with respect to FIG. 2, the functions of the data comparators 406a, 406b and error comparators 404a, 404b, 404c, 404d in FIG. 4 can be swapped. However, there are constraints regarding which comparators can be swapped, as the value of $a_{k-1}$ plays into how the comparators are used. The first error comparator 404a CE0 or the third error comparator 404c CE2 can be swapped with the first data comparator 406a CD0, as they are active when $a_{k-1}$ is LOW. The second error comparator 404b CE1 or the fourth error comparator 404d CE3 can be swapped with the second data comparator 406b CD1, as these three comparators are active when $a_{k-1}$ is HIGH.

Figure 5:
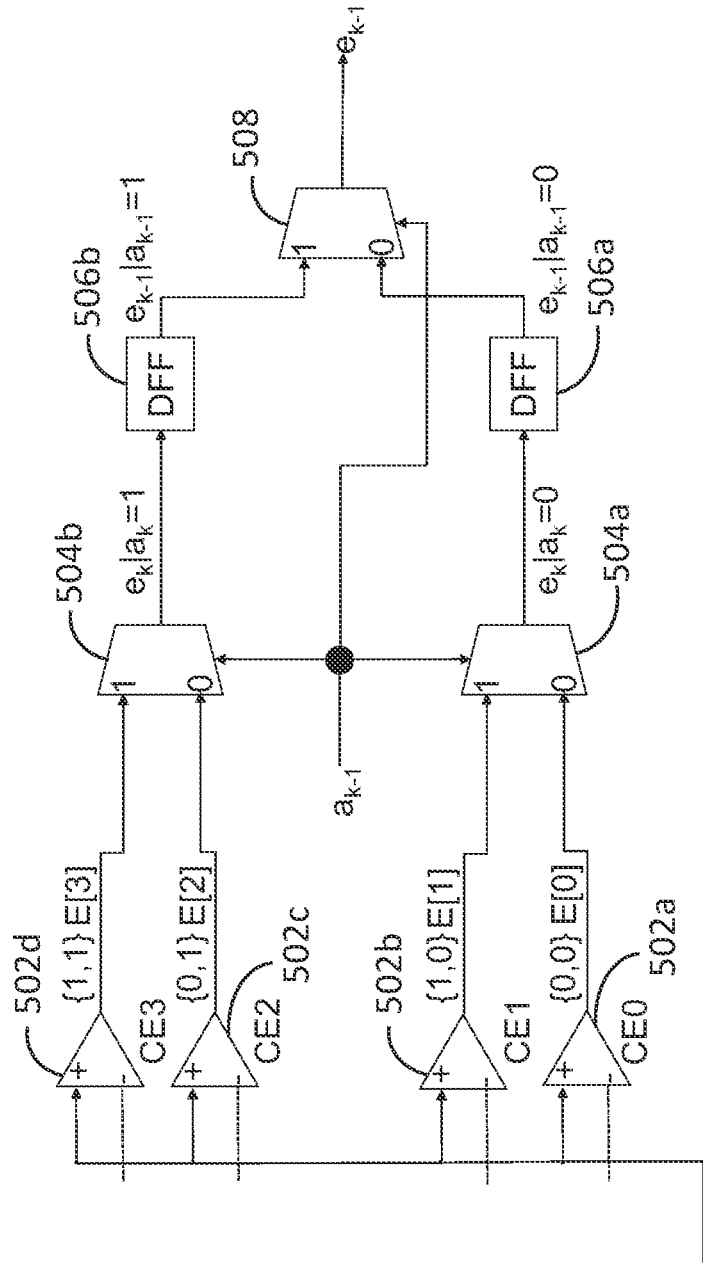
FIG. 5 is a diagram illustrating error bit selection logic, according to some embodiments of the disclosure.

FIG. 5 is a diagram 500 illustrating error bit selection logic, according to various embodiments of the disclosure. FIG. 5 shows digital hardware that can be added after the error comparators in FIG. 4 for error bit selection. In particular, the error comparators 502a, 502b, 502c, 502d can be the error comparators 404a, 404b, 404c, 404d. The error bit, $e_k$, uses the current data decision akin addition to $a_{k-1}$ to select the closest slicer target. A first stage includes first 504a and second 504b multiplexers. The first multiplexer 504a receives the outputs E[0] and E[1] from the first 502a and second 502b comparators as inputs. The first 502a and second 502b comparators, from which these bits originate, have $a_k$=0. A second multiplexer 504b receives the outputs E[2] and E[3] from the third 502c and fourth 502d comparators as its inputs. The third 502c and fourth 502d comparators from which these bits originate have $a_k$=1. The output of the first stage 1 multiplexer 504a is delayed by a first D-type flip-flop (DFF) 506a. The output of the second stage 1 multiplexer 504b is delayed by second DFF 506b. The outputs from the first 506a and second 506b DFFs are applied to a third multiplexer 508. If selection input $a_{k-1}=1$, the multiplexer 508 selects the output of the second DFF 506b to yield $e_{k-1}$. Otherwise, the multiplexer 508 selects the output of the first DFF 506a is chosen to yield $e_{k-1}$.

Analog Front-End Offset Compensation

Figure 6:
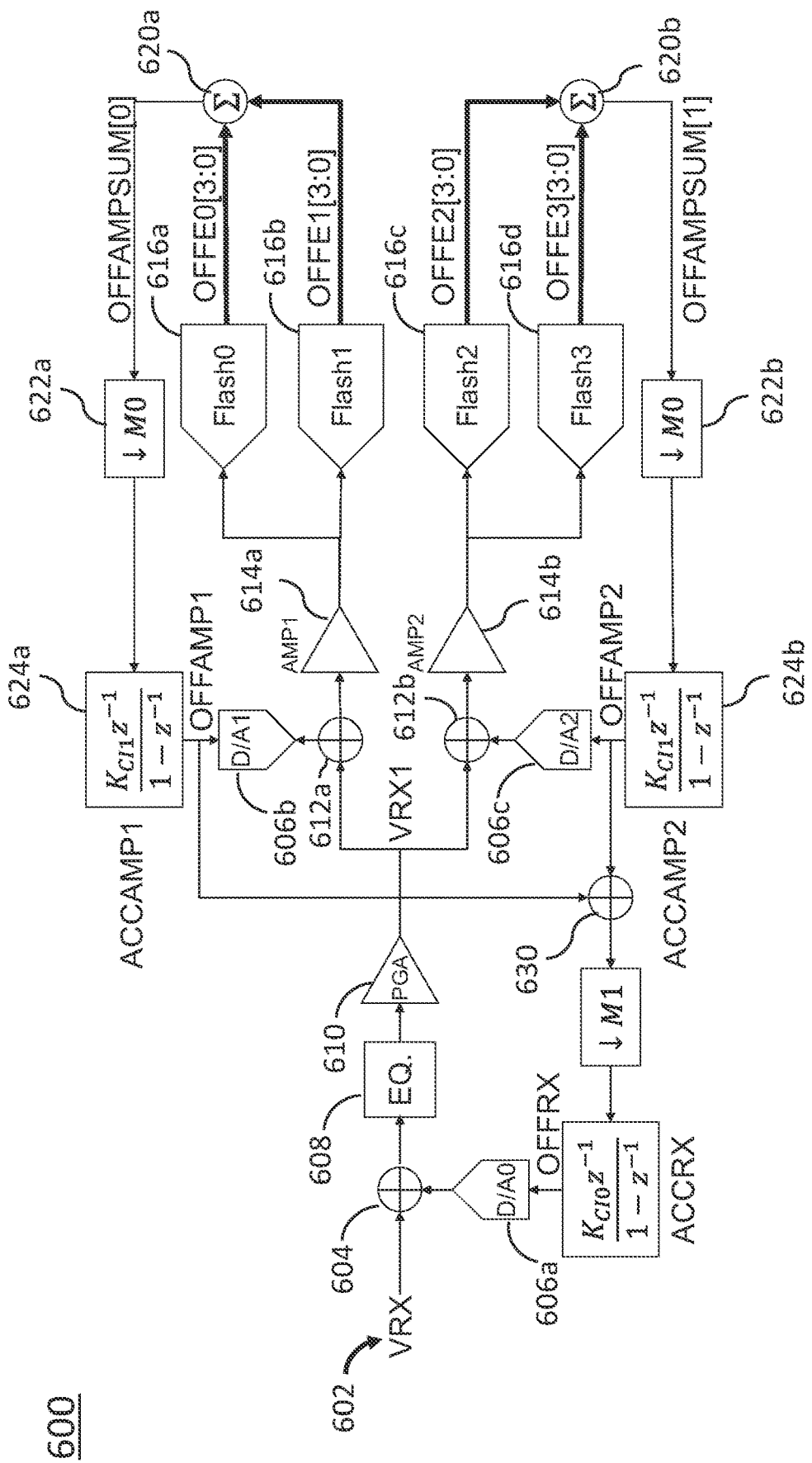
FIG. 6 is a diagram illustrating a slicer schematic for a speculative digital front end (DFE) receiver, according to some embodiments of the disclosure.

FIG. 6 shows a diagram 600 including a slicer for a DFE receiver, including signal processing for offset compensation, according to various embodiments of the disclosure. The receiver 600 receives an input signal 602, and the input signal 602 is added to the output of a first offset cancelling D/A converter 606a at a summer 604. The output from the summer 604 is input to an equalizer 608, and the output from the equalizer 608 is input to a programmable gain amplifier 610. The output from the amplifier 610 is split into two parallel lines. The signal on one parallel line is input to a second summer 612a, where it is added to the output of a second offset-cancelling D/A converter 606b. The signal on the other parallel line is input to a third summer 612b, where it is added to the output of a third offset-cancelling D/A converter 606c.

The output from the second summer 612a is input to a first voltage amplifier 614a, and the output from the first voltage amplifier 614a is split into two parallel lines and input into a first flash analog-to-digital converter (ADC) 616a and a second flash ADC 616b. The output from the third summer 612b is input to a second voltage amplifier 614b, and the output from the second voltage amplifier 614b is split into two parallel lines and input into a third flash ADC 616c and a fourth flash ADC 616d.

Offset compensation is implemented in such a manner that the sum of the offset compensation from the next stage in the signal chain is zero. In particular, comparator offset words for the flash A/D converters 616a-616d sum to zero through the application of an offset compensation voltage OFFAMP1 to the first voltage amplifier 614a through the second offset-cancelling D/A converter 606b, and through the application of an offset compensation voltage OFFAMP2 to the second voltage amplifier 614b through the third offset-cancelling D/A converter 606c. The sum of the offset cancellation voltages OFFAMP1 and OFFAMP2 are also zero, through the application of a voltage from the first offset-cancelling D/A converter 606a set by the offset compensation voltage OFFRX.

Offset Cancellation of the Voltage Amplifiers

The first flash ADC 616a and the second flash ADC 616b share the output of the first voltage amplifier 614a, while the third flash ADC 616c and the fourth flash ADC 616d share the output of the second voltage amplifier 614b. The offset from an error comparator in the first flash ADC 616a and the offset from an error comparator in the second flash ADC 616b are added together at a first summer 620a, which outputs a first digital sum (OFFAMPSUM[0]). Similarly, the offset from an error comparator in the third flash ADC 616c and the offset from an error comparator in the fourth flash ADC 616d are added together at a second summer 620b, which outputs a second digital sum (OFFAMPSUM[1]). The first digital sum can be stated as:

$$OFFAMPSUM[0] = \sum_{i=0}^{3} OFFE0[i] + OFFE1[i]$$

And the second digital sum can be states as:

$$OFFAMPSUM[1] = \sum_{i=0}^{3} OFFE2[i] + OFFE3[i]$$

The first and second digital sums are input to first 622a and second 622b downsamplers, respectively. The first digital sum (OFFAMPSUM[0]) can be downsampled by a factor M0, as the bandwidth of the cancellation loops enclosing the first voltage amplifier 614a is lower than the bandwidth of the comparator cancellation loops. Similarly, the second digital sum (OFFAMPSUM[1]) can be downsampled by a factor M0, as the bandwidth of the cancellation loops enclosing the second voltage amplifier 614b is lower than the bandwidth of the comparator cancellation loops.

The downsampled value of the first digital sum (OFFAMPSUM[0]) is applied to a first digital integrator 624a. A property of an integrator, such as the first digital integrator 624a, is that non-zero average value on its input will ramp until the accumulator saturates. The optimal setting for the output (OFFAMP1) from the first digital integrator 624a occurs when the sum of the comparator offset cancellation codes from the first 616a and second 616b flash ADC's is zero, and thus when the first digital sum equals zero (OFFAMPSUM[0]=0). Thus, the first digital integrator 624a generating the output value OFFAMP1 forces the average offset of the comparators from the first 616a and second 616b flash ADCs to zero.

Similarly, the downsampled value of the second digital sum (OFFAMPSUM[1]) is applied to a second digital integrator 624b, and similar signal processing drives the output OFFAMP2 of the second digital integrator 624b such that the second digital sum is zero. In particular, the optimal setting for the output (OFFAMP2) from the second digital integrator 624b occurs when the sum of the comparator offset cancellation codes from the third 616c and fourth 616d flash ADC's is zero, and thus when the second digital sum equals zero (OFFAMPSUM[1]=0). Thus, the second digital integrator 624b generates the output value OFFAMP2 to force the average offset of the comparators from the third 616c and fourth 616d flash ADCs to zero.

In one implementation, downsamplers are positioned on the outputs from each of the first 616a, second 616b, third 616c, and fourth 616d flash ADCs such that the summation at the first 620a and second 620b summers is performed less frequently.

Offsets in the signal chain are referred to the main error comparators. As a result, when data comparators are swapped with error comparators to update their offset compensation codes, the integrator gains for the first 624a and second 624b digital integrators are set to zero. In this example, there are four error comparators. However, the offset cancellation systems and methods described herein are not restricted to four comparators and can include slicers with fewer than four comparators or more than four comparators. Additionally, the offset cancellation systems and methods described herein can include slicers where a subset of the threshold levels have error comparators. In one example, the offset cancellation system is implemented for PAM-4 with quarter-rate sampling, and the first 616a and third 616c flash ADC's each have two error comparators applied to inner levels of +VS and −VS, while the outer levels of +3VS and −3VS are not monitored by the first 616a and third 616c flash ADC's. Instead, the second 616b and fourth 616*d* flash ADCs each have two comparators with thresholds of −3VS and +3VS.

Offset Calibration Accounting for Initial Settings

Figure 7:
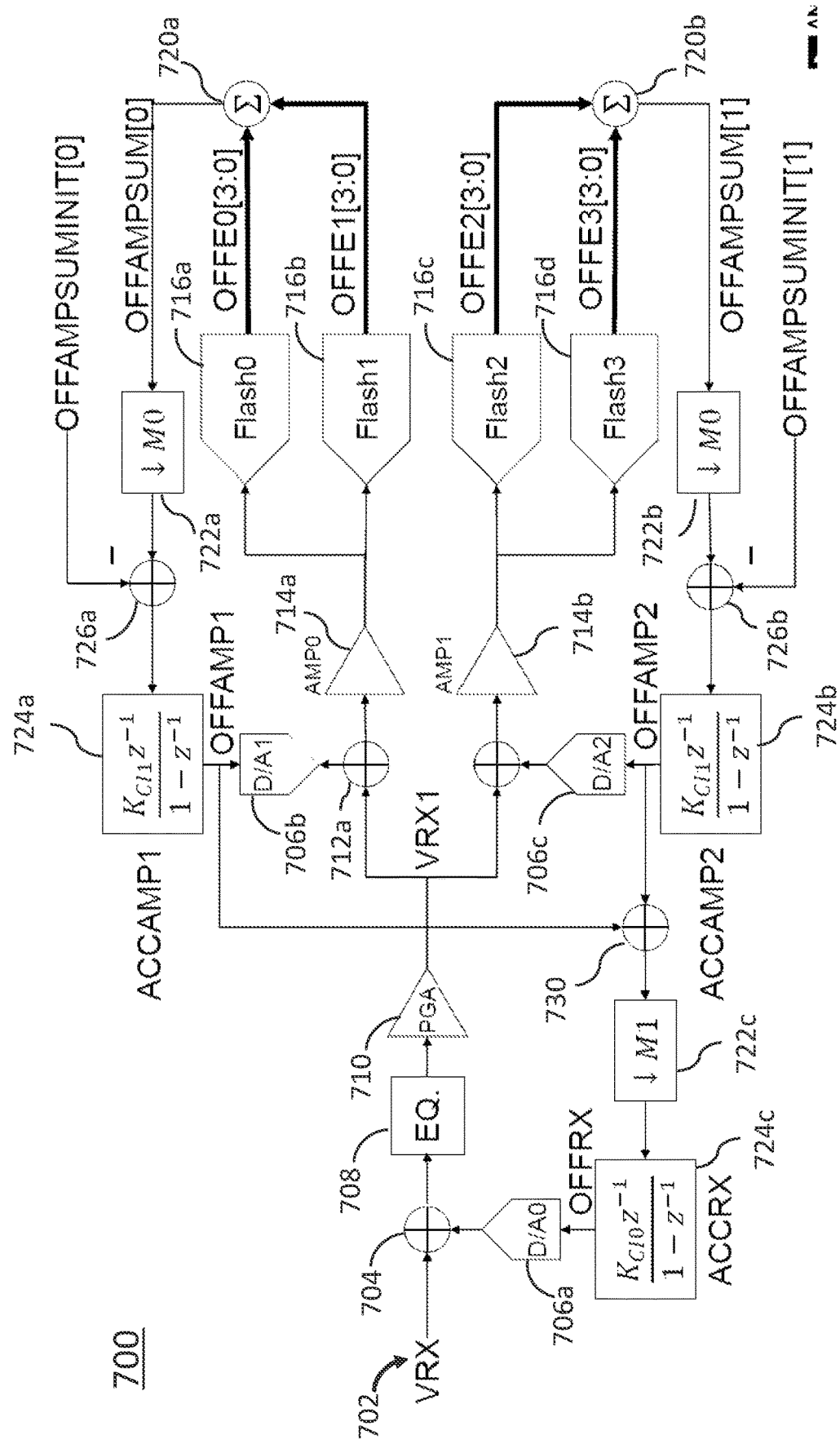
FIG. 7 is a diagram illustrating offset compensation accounting for codes determined at startup, according to some embodiments of the disclosure.

FIG. 7 is a diagram 700 illustrating offset compensation accounting for codes determined at startup, according to some embodiments of the disclosure. In particular, the diagram 700 shows a circuit implementation for which offset values during initial offset calibration are identical to the offset values at the moment these loops are enabled.

At startup, there is no logic forcing the output (OFFAMP-SUM[0]) of the first summer 720*a* or the output (OFFAMP-SUM[1]) of the second summer 720*b* to zero. If such a constraint is imposed, a large offset on one of the comparators could skew the one or both of the outputs (OFFAMP1, OFFAMP2) from the first 724*a* and second 724*b* integrators in such a manner that the first 714*a* and second 714*b* voltage amplifiers can saturate asymmetrically. As shown in FIG. 7, the offset compensation circuit as implemented in FIG. 6 can have a different solution than an algorithm in which an amplifier or comparator input is shorted and offset compensation performed. In particular, in FIG. 7, the offset values during initial offset calibration are identical to the offset values at the point in time these loops are enabled.

FIG. 7 includes additional adders. A fourth adder 726*a* is positioned between the downsampler 722*a* and the integrator 724*a* and subtracts a first initial value (OFFAMPSUM-INIT[0]) from the output from the downsampler 722*a*. Similarly, a fifth adder 726*b* is positioned between the downsampler 722*b* and the integrator 724*b* and subtracts a second initial value (OFFAMPSUMINIT[1]) from the output from the downsampler 722*b*. After an initial calibration, the first initial value (OFFAMPSUMINIT[0]) is set equal to the output (OFFAMPSUM[0]) from the first summer 720*a* and the second initial value (OFFAMPSUMINIT[1]) is set equal to the output (OFFAMPSUM[1]) from the second summer 720*b*. These initial conditions are subtracted from the output of the downsamplers 722*a*, 722*b*. The difference between the output from the first downsampler 722*a* and the first initial value (OFFAMPSUMINI[0]) is output from the fourth adder 726*a* and input to the first integrator 724*a*. The difference between the output from the second downsampler 722*b* and the second initial value (OFFAMPSUMINI[1]) is output from the fifth adder 726*b* and input to the second integrator 724*b*. Thus, for the average input (OFFAMP1) to the second offset-cancelling D/A converter 706*b* to be zero, the steady-state value of the output (OFFAMPSUM[0]) from the first summer 720*a* is the first initial value (OFFAMP-SUMINIT[0]). Similarly, for the average input (OFFAMP2) the third offset-cancelling D/A converter 706*c* to be zero, the steady-state value of the output (OFFAMPSUM[1]) from the second summer 720*b* is the second initial value (OFFAMP-SUMINIT[1]).

Front-End Offset Cancellation

Most receivers implement offset cancellation, at or close to their input. In the systems and method described herein, the output of the first offset-cancelling D/A converter sums with the input VRX. Referring to FIG. 7, the input to the first offset-cancelling D/A converter 706*a* is added to the input 702 at the first adder 704. The input (OFFRX) to the first offset-cancelling D/A converter 706*a* is set to a value such that the offsets, when referred to the input 702 (VRX), are zero. The outputs from each of the first 724*a* and second 724*b* integrators are added at a sixth adder 730, and the sum is input to a third integrator 724*c*. In some examples, the output from the sixth adder 730 is downsampled by a factor of M1 at a third downsampler 722*c*. In a steady-state system, the sum of the outputs from the first 724*a* and second 724*b* integrators is zero, and thus the input to the third integrator 724*c* is zero.

Loop Analysis

Figure 8:
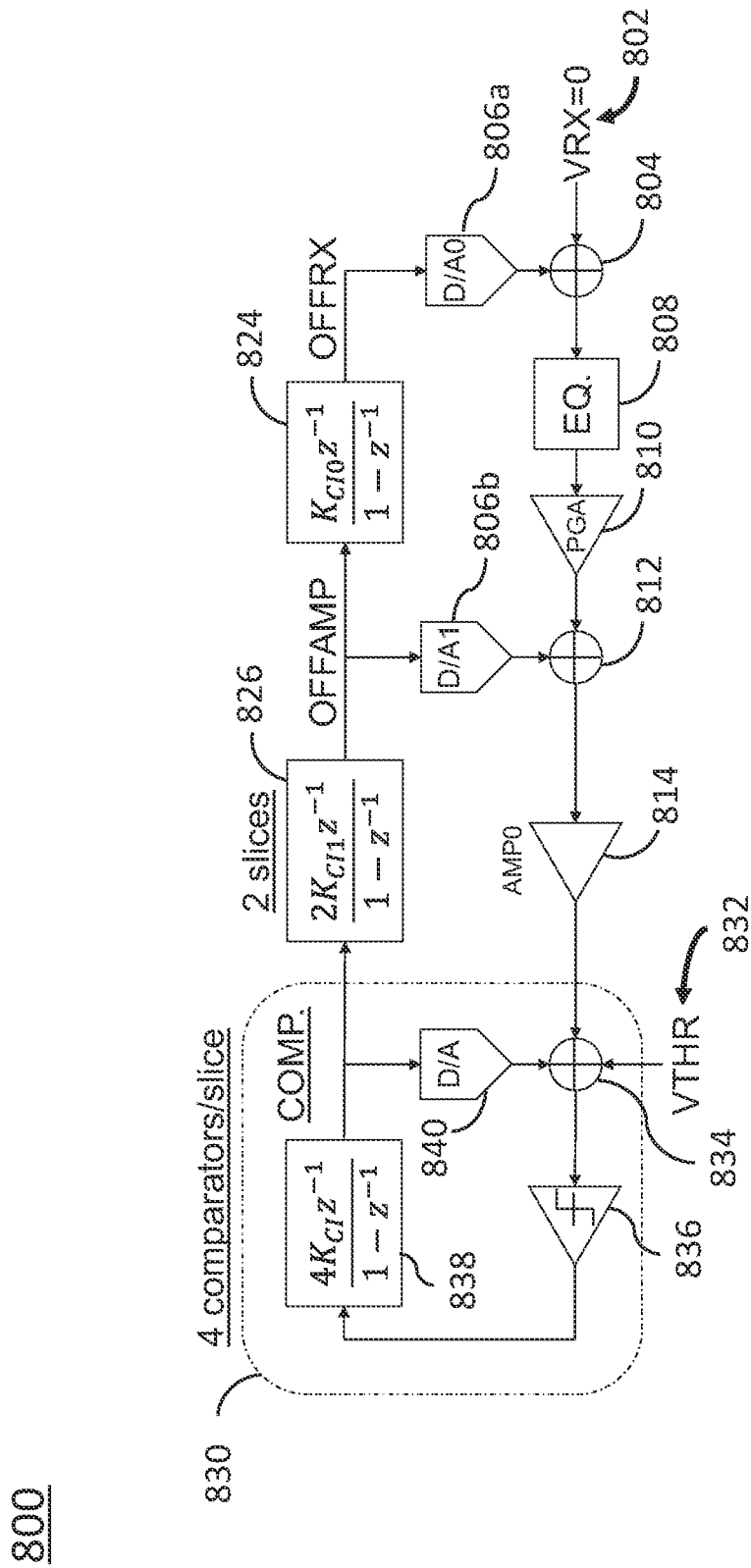
FIG. 8 is a diagram illustrating a state-space representation of the nested offset cancellation architecture, according to some embodiments of the disclosure.

FIG. 8 is a diagram 800 illustrating a state-space representation of a nested offset cancellation architecture, according to various embodiments of the disclosure. According to various examples, the bandwidth of the DC offset cancellation loops is significantly lower than the bit rate. Hence, the loop is readily transformed from a discrete to a continuous-time model using Forward Euler substitution for the digital integrators. FIG. 8 shows a simplified block diagram with the downsamplers M0 and M1 set to 1.

Referring to the right side of FIG. 8, there is an input 802 (VRX). The input 802 is set to zero during calibration of the system. The architecture shown in FIG. 8 also includes a first offset-cancelling DAC 806*a*, and the output from the first DAC 806*a* is summed with the input 802 at a first adder 804, and then input to an equalizer 808. The output of the equalizer 808 is input to a programmable gain amplifier 810. The first DAC 806*a* receives as input a digital code (OF-FRX), which is the output from a first digital integrator 824. The first digital integrator 824 has a gain $K_{CI0}$. The output (OFFAMP) from a second integrator 826 is the input to the first integrator 824. In various implementations, the second integrator 826 includes parallel integrators (as shown in FIG. 7) consolidated into a single block. Note that the gain of L parallel integrators is a factor of L times the gain of a single integrator. The output (OFFAMP) of the second integrator 826 is input to both the first integrator 824 and also to a second DAC 806*b*. The output of the second DAC is added to the output of the programmable gain amplifier 810 at a second adder 812, and the sum is input to a first amplifier 814.

Each comparator has an integrator storing its offset control word on COMP. On the left side of FIG. 8, the box 830 shows a comparator offset compensation loop 830 that can be treated as a delta-modulator A/D converter. The loop 830 has a higher bandwidth than the architecture to the right of the loop 830 in FIG. 8. The delta-modulator A/D converter includes an input 832 (VTHR), a third adder 834, a comparator 836, a third integrator 838, and a third D/A converter 840. At the third adder 834, the output from the first amplifier 814 is added to the input 832 (VTHR) and the output from the third D/A converter 840. The sum from the third adder 834 is input to the comparator 826. In some examples, the comparator 836 is a quantizer. The output from the comparator 826 is input to the third integrator 838, and the output from the third integrator 838 is input to the third D/A converter 840 and to the second integrator 826. In some examples, there are four iterations of the loop 830 for each slice of the architecture of FIG. 8.

Figure 9:
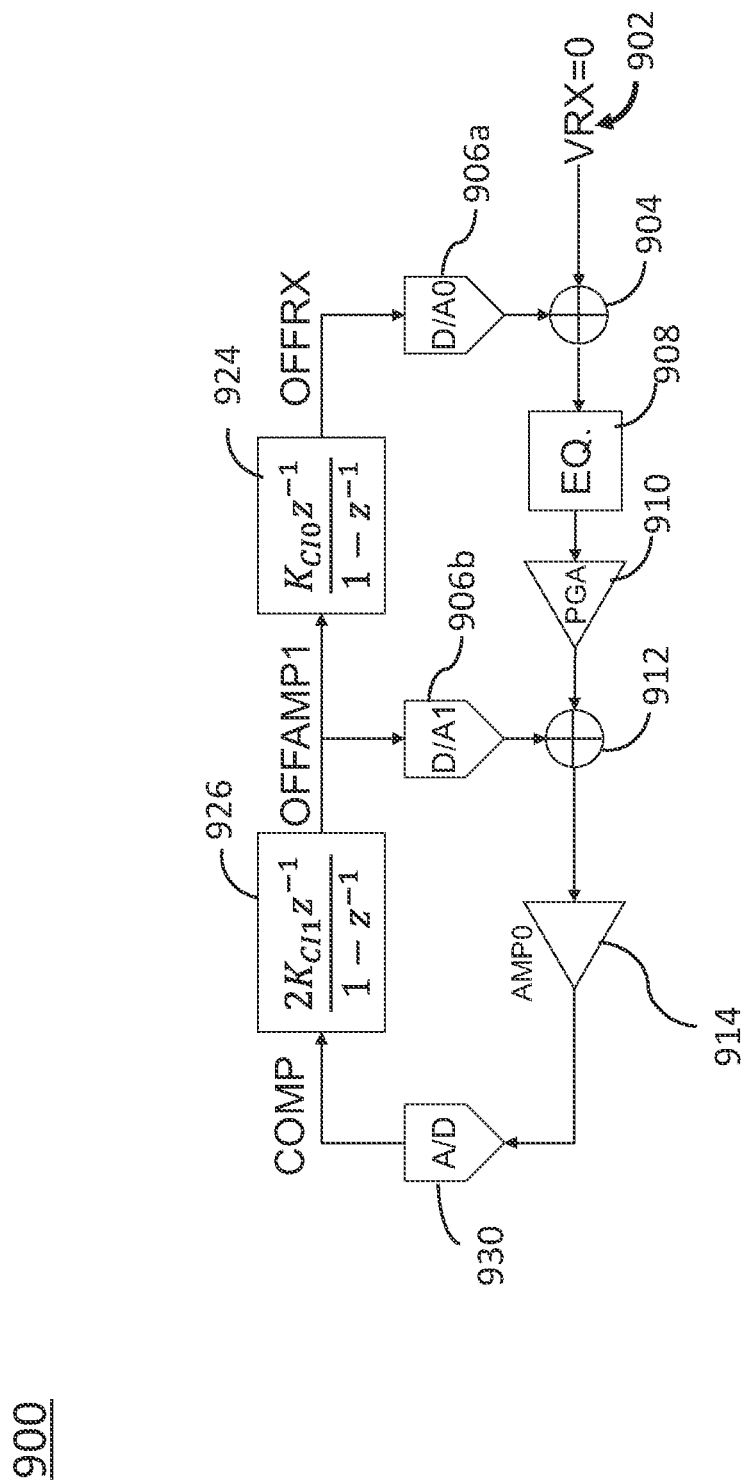
FIG. 9 is a diagram illustrating A/D analogy for comparator offset compensation, according to some embodiments of the disclosure.

FIG. 9 is a diagram 900 illustrating an architecture in which the comparator offset compensation loop is replaced by an A/D converter 930, according to embodiments of the disclosure. The nested offset compensation loop simplifies to a second-order state space filter, where the first state is the output (OFFAMP1) of a first integrator 926 and the second state is the output (OFFRX) of a second integrator 924.

Figure 10:
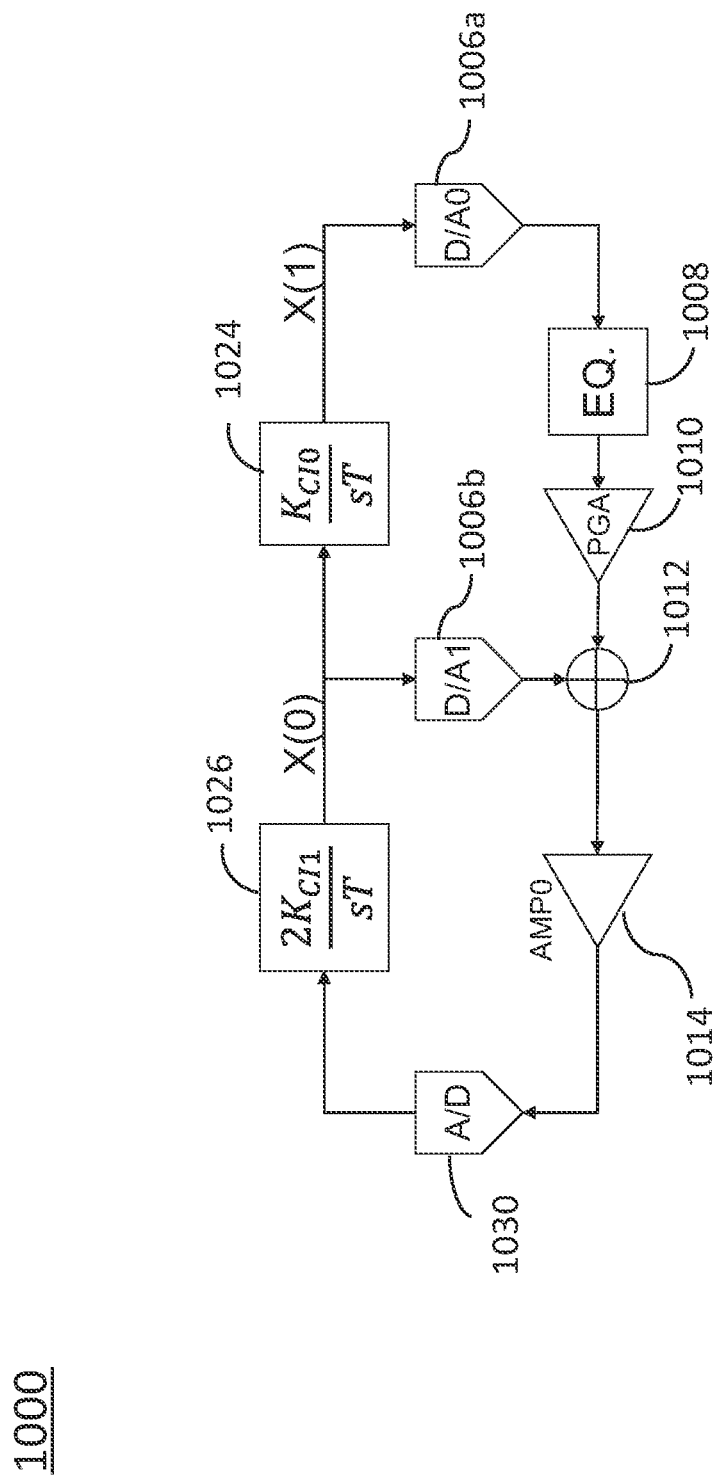
FIG. 10 is a diagram illustrating a continuous-time model, according to some embodiments of the disclosure.

FIG. 10 is a diagram 1000 showing a continuous time architecture, according to various embodiments of the disclosure. According to various implementations, the system is heavily oversampled, and a Forward Euler transform $$s = \frac{z-1}{T}$$

leads to the continuous-time model shown in FIG. 10. T is the clock period of the first integrator 1026, which is the clock rate after the downsampler $M_0$. This can be cast as a state-space matrix so the two states are the outputs of the first 1026 and second 1024 integrators and can be labelled $\{X(0), X(1)\}$.

Figure 11:
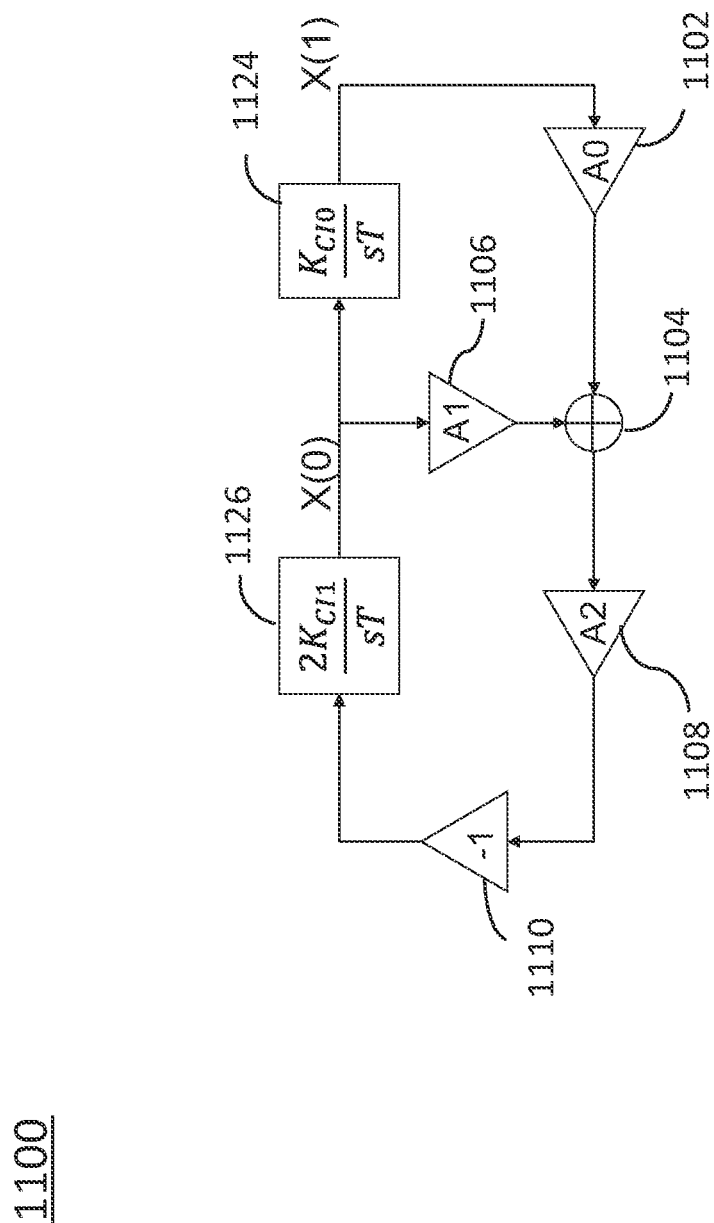
FIG. 11 is a diagram illustrating a system model incorporating simplifications, according to some embodiments of the disclosure.

FIG. 11 shows a simplified continuous-time model 1100 of nested feedback loops, according to various embodiments of the disclosure. A new set of variables is used to capture DC gains through the analog blocks. In particular, a first analog block 1102 (A0) equals the first D/A converter (D/A0) times the equalizer times the programmable gain amplifier. A second analog block 1106 (A1) equals the second D/A converter (D/A1). A third analog block 1108 (A2) equals the amplifier times the A/D converter (A/D). Thus, with reference to FIGS. 10 and 11, A0=DA0×EQ× PGA; A1=DA1; and A2=AMP0×AD.

A state space matrix for the system in FIG. 11 is given by the following equation:

$$s\begin{Bmatrix} X(0) \\ X(1) \end{Bmatrix} = \frac{1}{T}\begin{bmatrix} -2K_{CI1}A_1A_2 & -A_0A_2 \\ K_{CI0} & 0 \end{bmatrix}\begin{Bmatrix} X(0) \\ X(1) \end{Bmatrix}$$

The two Eigenvalues of the above matrix are the closed-loop poles of the offset compensation system. The Eigenvalues are the roots ($s_1$, $s_2$) of the polynomial expression:

$$s^2 + \frac{2K_{CI1}A_1A_2}{T}s + \frac{K_{CI0}A_0A_2}{T} = 0$$

The coefficients A0, A1 and A2 fall out of the block-level design. A step in offset from VRX to the output of D/A0 sees a second-order low-pass filter settling. $K_{CI0}$, $K_{CI1}$ and the clock period T is selected so the loop settles faster than the offsets change. The above expressions provide guidance in this loop design.

SELECT EXAMPLES

Example 1 provides a method for optimizing offset compensation in a receiver including receiving a signal at an input in a receive path, applying offset cancellation to the signal at each of a plurality of offset compensation digital-to-analog converters, generating a plurality of offset compensation codes at a plurality of comparators, summing at least a subset of the plurality of offset compensation codes, comparing the summed offset compensation codes with a digital reference.

Example 2 provides a method according to one or more of the preceding and/or following examples, wherein applying offset cancellation includes applying offset cancellation to the signal when the receive path includes a fan-out of at least two.

Example 3 provides a method according to one or more of the preceding and/or following examples, wherein the digital reference is zero.

Example 4 provides a method according to one or more of the preceding and/or following examples, wherein the digital reference is a sum of comparator offsets stored at start-up.

Example 5 provides a method according to one or more of the preceding and/or following examples, further comprising determining a difference between the summed offset compensation codes and the digital reference and applying the difference to a digital accumulator.

Example 6 provides a method according to one or more of the preceding and/or following examples, further comprising generating a digital accumulator output and applying the digital accumulator output to at least one of the plurality of offset compensation digital-to-analog converters.

Example 7 provides a method according to one or more of the preceding and/or following examples, further comprising cancelling analog offsets in a plurality of amplifiers.

Example 8 provides a method according to one or more of the preceding and/or following examples, further comprising quarter-rate sampling of the signal at a plurality of flash converters.

Example 9 provides a method according to one or more of the preceding and/or following examples wherein quarter-rate sampling includes sampling in rotation by each of the plurality of flash converters.

Example 10 provides a method according to one or more of the preceding and/or following examples, wherein generating the plurality of offset compensation codes at the plurality of comparators, includes generating data comparison codes at a plurality of data comparators, and generating error comparator codes at a plurality of error comparators.

Example 11 provides a method according to one or more of the preceding and/or following examples, further comprising switching one of the set of data comparators with one of the set of error comparators.

Example 12 provides a system for optimizing offset compensation in a receiver comprising an input for receiving a signal in a receive path, a plurality of digital-to-analog converters, configured to apply offset compensation, a plurality of comparators configured to generate a plurality of offset compensation codes, a summer configured to sum at least a subset of the plurality of offset compensation codes, and a comparator for comparing the summed offset compensation codes with a digital reference.

Example 13 provides a system according to one or more of the preceding and/or following examples, wherein the receive path includes a fan-out of at least two, and wherein at least one of the plurality of digital-to-analog converters is configured to apply offset compensation prior to the fan-out.

Example 14 provides a system according to one or more of the preceding and/or following examples, further comprising at least one amplifier for amplifying the signal Example 15 provides a system according to one or more of the preceding and/or following examples, wherein one of the plurality of digital-to-analog converters is positioned before the at least one amplifier and configured to apply offset compensation to the signal.

Example 16 provides a system according to one or more of the preceding and/or following examples, further comprising a plurality of flash analog-to-digital converters configured to produce the comparator offset compensation codes.

Example 17 provides a system according to one or more of the preceding and/or following examples, wherein the comparator is configured to determine a difference between the summed offset compensation codes and the digital references and provide a comparator output.

Example 18 provides a system according to one or more of the preceding and/or following examples, further comprising a digital accumulator configured to receive the comparator output and generate an input to at least one of the plurality of digital-to-analog converters.

Example 19 provides a system according to one or more of the preceding and/or following examples, the plurality of comparators includes a set of data comparators configured to execute a data comparison function and a set of error comparators configured to execute an error comparison function.

Example 20 provides a system according to one or more of the preceding and/or following examples, wherein at least one of the set of data comparators is switched with at least one of the set of error comparators.

Example 21 provides a system for optimizing offset compensation in a receiver comprising an input for receiving a signal in a receive path, a plurality of digital-to-analog converters, configured to apply offset compensation to the signal, means for generating a plurality of offset compensation codes, and means for comparing offset compensation codes with a digital reference.

Example 22 provides a system according to one or more of the preceding and/or following examples, further comprising a summer configured to sum at least a subset of the plurality of offset compensation codes.

Variations and Implementations

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the clocking and filtering functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that use sampled analog, some of which may be associated with processing real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to clocking in sampled analog systems, illustrate only some of the possible clocking functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claims is:
1. A method for optimizing offset compensation in a receiver comprises:
   receiving a signal at an input in a receive path;
   applying offset cancellation to the signal at each of a plurality of offset compensation digital-to-analog converters;
   generating a plurality of offset compensation codes at a plurality of comparators;
   summing at least a subset of the plurality of offset compensation codes;
   comparing the summed offset compensation codes with a digital reference.
2. The method of claim 1, wherein applying offset cancellation includes applying offset cancellation to the signal when the receive path includes a fan-out of at least two.
3. The method of claim 1, wherein the digital reference is zero.
4. The method of claim 1, wherein the digital reference is a sum of comparator offsets stored at start-up.
5. The method of claim 1, further comprising:
   determining a difference between the summed offset compensation codes and the digital reference; and
   applying the difference to a digital accumulator.
6. The method of claim 5, further comprising generating a digital accumulator output and applying the digital accumulator output to at least one of the plurality of offset compensation digital-to-analog converters.
7. The method of claim 1, further comprising cancelling analog offsets in a plurality of amplifiers.

8. The method of claim 1, further comprising quarter-rate sampling of the signal at a plurality of flash converters.

9. The method of claim 8, wherein quarter-rate sampling includes sampling in rotation by each of the plurality of flash converters.

10. A system for optimizing offset compensation in a receiver comprises:
- an input for receiving a signal in a receive path;
- a plurality of digital-to-analog converters, configured to apply offset compensation;
- a plurality of comparators configured to generate a plurality of offset compensation codes;
- a summer configured to sum at least a subset of the plurality of offset compensation codes; and
- a comparator for comparing the summed offset compensation codes with a digital reference.

11. The system of claim 10, wherein the receive path includes a fan-out of at least two, and wherein at least one of the plurality of digital-to-analog converters is configured to apply offset compensation prior to the fan-out.

12. The system of claim 10, further comprising at least one amplifier for amplifying the signal.

13. The system of claim 12, wherein one of the plurality of digital-to-analog converters is positioned before the at least one amplifier and configured to apply offset compensation to the signal.

14. The system of claim 10, further comprising a plurality of flash analog-to-digital converters configured to produce the comparator offset compensation codes.

15. The system of claim 10, wherein the comparator is configured to determine a difference between the summed offset compensation codes and the digital references and provide a comparator output.

16. The system of claim 15, further comprising a digital accumulator configured to receive the comparator output and generate an input to at least one of the plurality of digital-to-analog converters.

17. The system of claim 10, wherein the plurality of comparators includes a set of data comparators and a set of error comparators.

18. The system of claim 17, wherein at least one of the set of data comparators is switched with at least one of the set of error comparators.

19. A system for optimizing offset compensation in a receiver comprises:
- an input for receiving a signal in a receive path;
- a plurality of digital-to-analog converters, configured to apply offset compensation to the signal;
- means for generating a plurality of offset compensation codes;
- means for comparing offset compensation codes with a digital reference; and
- a summer to sum at least a subset of the plurality of offset compensation codes.

20. The system of claim 19, further comprising:
determining a difference between the summed offset compensation codes and the digital reference; and
applying the difference to a digital accumulator.

* * * * *